US012378995B2

(12) United States Patent
Drügemöller et al.

(10) Patent No.: US 12,378,995 B2
(45) Date of Patent: Aug. 5, 2025

(54) LINEAR GUIDE, CARRIAGE, END CAP AND METHOD FOR LUBRICATION

(71) Applicant: Ewellix AB, Gothenburg (SE)

(72) Inventors: Andreas Drügemöller, Schweinfurt (DE); Yung-Chang Chiou, Taoyuan (TW); Po-Chih Huang, Taoyuan (TW); Fung Cheung, Taoyuan (TW)

(73) Assignee: Ewellix AB, Gothenburg (SE)

( * ) Notice: Subject to any disclaimer, the term of this patent is extended or adjusted under 35 U.S.C. 154(b) by 141 days.

(21) Appl. No.: 17/959,345

(22) Filed: Oct. 4, 2022

(65) Prior Publication Data

US 2023/0103322 A1  Apr. 6, 2023

(30) Foreign Application Priority Data

Oct. 6, 2021 (DE) ............ 10 2021 125 974.6

(51) Int. Cl.
*F16C 29/06* (2006.01)
*F16C 33/66* (2006.01)
*F16N 21/02* (2006.01)

(52) U.S. Cl.
CPC .......... *F16C 29/0609* (2013.01); *F16C 33/66* (2013.01); *F16N 21/02* (2013.01); *F16C 2322/39* (2013.01)

(58) Field of Classification Search
CPC .. F16C 29/0609; F16C 33/6659; F16C 33/66; F16C 33/6622; F16C 2322/39; F16N 21/02
USPC .................. 215/250–257; 220/265
See application file for complete search history.

(56) References Cited

U.S. PATENT DOCUMENTS

| 2,066,390 A * | 1/1937 | Cahoon ............ B65D 55/024 215/253 |
| 4,669,620 A * | 6/1987 | Coifman ............ B65D 55/024 215/220 |
| 4,681,243 A * | 7/1987 | Takasugi ............ B65D 51/226 222/85 |
| 4,760,931 A * | 8/1988 | Gach .................. B65D 39/02 215/254 |
| 4,886,374 A * | 12/1989 | Osawa ............ F16C 29/0609 384/13 |
| 5,052,589 A * | 10/1991 | O'Meara .............. B67B 7/24 215/257 |
| 2008/0142473 A1* | 6/2008 | Cho .................. B65D 51/285 215/329 |
| 2014/0048507 A1* | 2/2014 | Brambilla ............ B65D 51/30 215/257 |

FOREIGN PATENT DOCUMENTS

| DE | 19647173 A1 | 5/1998 |
| DE | 102007035628 A1 | 2/2009 |
| DE | 102009016459 A1 | 10/2010 |
| TW | M463303 U | 10/2013 |
| TW | M501501 U | 5/2015 |

* cited by examiner

*Primary Examiner* — Alan B Waits
(74) *Attorney, Agent, or Firm* — Laurence A. Greenberg; Werner H. Stemer; Ralph E. Locher

(57) ABSTRACT

An end cap for a carriage of a linear guide. The end cap has a closed lubrication port which is openable by operatively connecting a lubrication fitting to the lubrication port. The is formed by injection molding and the closed lubrication port of the end cap is formed by rotary demolding.

11 Claims, 2 Drawing Sheets

LINEAR GUIDE, CARRIAGE, END CAP AND METHOD FOR LUBRICATION

CROSS-REFERENCE TO RELATED APPLICATION

This application claims the priority, under 35 U.S.C. § 119, of German Patent Application DE 10 2021 125 974.6, filed Oct. 6, 2021; the prior application is herewith incorporated by reference in its entirety.

FIELD AND BACKGROUND OF THE INVENTION

The present invention relates to an end cap for a carriage of a linear guide, a carriage, a linear guide, a method for obtaining an end cap, and a method for lubricating a carriage.

For translating components, e.g. machine parts, relative to each other, linear guides containing a guide rail and a carriage movable along the guide rail are known. In order to enhance service life and provide smooth operation, linear bearings in the carriage may be lubricated by a user. To this end, the carriage usually contains at least one lubrication port to which the user can connect a lubrication fitting.

SUMMARY OF THE INVENTION

It is an object of the invention to improve the lubrication process, in particular to simplify the lubrication process.

This object is achieved by an end cap for a carriage of a linear guide, a carriage, a linear guide, a method for obtaining an end cap, and a method for lubricating a carriage according to the independent claims.

Preferred embodiments of the invention are subject to the dependent claims and the following description.

According to a first aspect of the invention, an end cap for a carriage of a linear guide has a closed lubrication port which is openable by operatively connecting a lubrication fitting to the lubrication port.

An aspect of the invention is based on the idea to provide on a carriage for a linear guide a closed lubrication port which is configured to be opened upon first use of the lubrication port. Preferably, the closed lubrication port is openable tool-free only by operatively connecting a lubrication nipple with the lubrication port. In other words, for opening the lubrication port, it is advantageously only required to couple the lubrication fitting with the port. By this means, the port can be opened en passant. In contrast to conventional lubrication ports which are only openable e.g. by drilling or cutting, a dedicated tool for opening the lubrication port of the proposed end cap is advantageously unnecessary. This may require less steps for the user to execute when lubricating the carriage for the first time and thus reduces effort. Accordingly, time and costs may be saved.

For example, the lubrication port may be configured to open to a lubrication channel of the end cap upon connecting the lubrication fitting. In other words, the lubrication port is preferably configured for creating a passage to the lubrication channel upon connecting the fitting.

Preferred embodiments of the invention and further aspects thereof are described below, each of which, unless expressly excluded, may be combined with each other and with the other aspects of the invention described below as desired.

In a preferred embodiment, the lubrication port comprises a mechanism configured to create the passage for the lubricant to the lubrication channel of the end cap when the lubrication nipple is operatively connected to the lubrication port. Advantageously, the mechanism is activatable by connecting the fitting to the port. By means of the mechanism, the lubrication port may be opened in a particularly reliable manner.

The mechanism may be activatable only once, i.e. upon the first time coupling the fitting to the port. Preferably, by activating the mechanism, at least a part of a material layer between the lubrication port and the lubrication channel is moved such that the passage is created.

In another preferred embodiment, the lubrication port contains a blind hole and is openable by inserting the lubrication nipple into the blind hole and exerting a force on the bottom of the blind hole. Advantageously, exerting the force activates the mechanism. Further advantageously, inserting the fitting into the hole exerts the force required for activating the mechanism. The mechanism is preferably arranged on the bottom of the blind hole. By this means, a compact form of the lubrication port may be maintained. Further, the mechanism may be well protected against accidental activation.

In yet another preferred embodiment, the lubrication port contains a threading and is openable by screwing the lubrication nipple into the lubrication port. This allows for en passant exerting the force on the bottom of the blind hole. In particular, this allows for exerting a force larger than an inserting force used for screwing the nipple into the port. Accordingly, the mechanism can be activated in a particularly reliable manner.

In yet another preferred embodiment, the lubrication port is puncturable by operatively connecting the lubrication fitting to the lubrication port. For example, the lubrication port may be configured such that an opening section of the lubrication port is punctured for establishing the passage to the lubrication channel upon connecting the fitting. Advantageously, the port is configured such that a material layer separating the lubrication port from the channel is punctured upon connecting the fitting. To this end, the port is preferably configured to be punctured at the bottom of the blind hole. By means of a puncturable lubrication port, the effort required for opening the port can be reduced even further.

In yet another preferred embodiment, the lubrication port contains a protrusion configured for at least partially abutting on the lubrication fitting, in particular on a tip thereof, when the lubrication fitting is operatively connected to the lubrication port. Preferably, the protrusion is arranged on the bottom of the blind hole. The protrusion may be configured to puncture the material layer separating the port from the lubrication channel when the lubrication fitting, in particular its tip, abuts on the protrusion and/or exerts a force thereon. By means of the protrusion a particularly defined opening of the lubrication port may be achieved.

In yet another preferred embodiment, the protrusion forms a ramp having a contact section at an upper end for contacting the lubrication fitting upon operatively coupling the lubrication fitting to the lubrication port. The upper end of the ramp preferably faces the lubrication fitting when connected to the port. Advantageously, the upper end is configured for receiving a force exerted by the lubrication fitting upon coupling to the port. Due to the slope of the ramp, as only the upper end will contact the lubrication fitting, a particularly high pressure can be exerted on the protrusion. Further, the lubrication port may be punctured in an opening section well defined by the upper end of the ramp.

In yet another preferred embodiment, the lubrication port comprises a predetermined breaking point. Advantageously, the breaking point is defined by at least a section of the contour of the protrusion, in particular the ramp. The breaking point is preferably formed by material weakening, i.e. thinning of the material layer separating the lubrication port and the lubrication channel. This allows for establishing well-defined passage to the lubrication channel in a well-controlled manner.

In yet another preferred embodiment, the lubrication port contains an opening section configured for hinging upon operatively connecting the lubrication fitting to the lubrication port. In other words, the opening section may be configured for being pushed in upon connecting the fitting to the port. For example, the opening section may hinge towards, in particular at least partially into, the lubrication channel when the fitting exerts a pressure on the protrusion. By configuring the opening section for hinging, the generation of material chips upon opening the port may be prevented.

According to a second aspect of the invention, a carriage for a linear guide has an end cap according to the first aspect of the invention.

According to a third aspect of the invention, a linear guide contains a guide rail and a carriage. The carriage is configured for linear movement along the guide rail and contains at least one end cap according to the first aspect of the invention.

According to a fourth aspect of the invention, a method for obtaining an end cap according to the first aspect of the invention includes injection molding the end cap and forming a lubrication port of the end cap by rotary demolding.

According to a fifth aspect of the invention, a method for lubricating a carriage of a linear guide includes opening a closed lubrication port of an end cap of the carriage, in particular an end cap according the first aspect of the invention, by operatively connecting a lubrication fitting to the lubrication port.

The properties, features and advantages of the invention described above, as well as the manner in which they are achieved, will be explained in more detail in connection with the figures in the following description of examples. Where appropriate, the same reference signs are used in different figures for the same or corresponding elements of the invention. The examples serve to explain the invention and do not limit the invention to the combination of features indicated therein, even with respect to functional features. Moreover, any of the features disclosed in the above description as well as in the examples below may be considered in isolation and suitably combined with the features of any of the above embodiments and their further aspects. In particular, each of the features described above and below may be combined alone or in conjunction with others of the described features with the end cap according to the first aspect of the invention, the carriage according to the second aspect of the invention, the linear guide according to the third aspect of the invention, the method according to the fourth aspect of the invention, and the method according to the fifth aspect of the invention.

Other features which are considered as characteristic for the invention are set forth in the appended claims.

Although the invention is illustrated and described herein as embodied in a linear guide, a carriage, an end cap and a method for lubrication, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
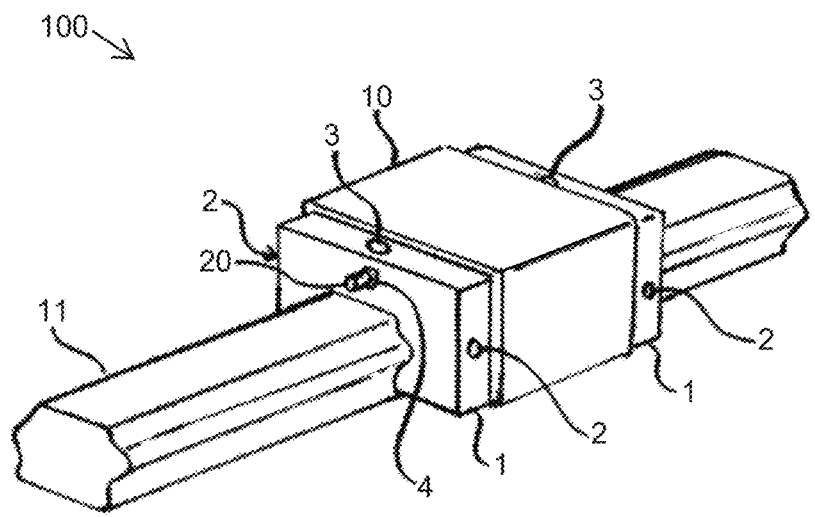
FIG. 1 is a diagrammatic, perspective view of an example of a linear guide.

Referring now to the figures of the drawings in detail and first, particularly to FIG. 1 thereof, there is shown an example of a linear guide 100 having a carriage 10 and a guide rail 11. The carriage 10 is configured for translation along the guide rail 11, i.e. along a longitudinal axis defined by the guide rail 11. To this end, the carriage 10 may house linear bearings containing rolling elements arranged (not visible) in between the guide rail 11 and the carriage 10.

The carriage 10 has two end caps 1 arranged at a front end and a rear end, respectively. The end caps 1 may fulfil various tasks in order to ensure smooth operation of the linear guide 100. For example, the end caps 1 may be configured for redirecting rolling elements of the linear bearing (not visible) from channels formed between the guide rail 11 and the carriage 10 into return channels (not visible) inside the carriage 10. Alternatively or additionally, the end caps 1 may be configured for sealing the inside of the carriage 10, in particular the linear bearing, from the outside such that particles as dirt or dust do not impair the operation of the linear guide 100.

Preferably, the end caps 1 are also configured for lubricating the carriage 10, in particular the linear bearing. To this end, they may comprise lubricant reservoirs from which lubricant is provided to the carriage, in particular the linear bearing, as required.

Alternatively or additionally, the end caps 1 comprise lubrication ports 2 and/or further lubrication ports 3, 4 for enabling a user to re-lubricate the carriage 10, in particular to refill the lubricant reservoirs (if present). For example, the lubrication ports 2, 3, 4 may be configured for connection with a lubrication fitting, respectively.

In the example shown in FIG. 1, the lubrication ports 2 are arranged on opposing side faces of the end caps 1, while the further lubrication ports 3 are arranged on a top face of the end caps 1. The further lubrication ports 4 are arranged on the front faces of the end caps 1. Exemplarily, a lubrication fitting 20 is also shown, the lubrication fitting 20 being operatively connected to the lubrication port 4 visible in FIG. 1.

It is preferred that these lubrication ports 2, 3, 4 are initially closed such that the user has to open them when first re-lubricating the carriage 10. This allows for an effective pre-lubrication of the carriage 10 upon manufacture. By means of the large number of lubrication ports 2, 3, 4 arranged at different positions on the end caps 1, the user has the freedom of selecting the lubrication ports 2, 3, 4 which suits him or the use of the linear guide 100 best, respectively.

Advantageously, at least a part of the lubrication ports 2 and further lubrication ports 3, 4, in particular the lubrication ports 2 arranged at the side faces of the end caps 1, are openable by operatively connecting the lubrication fitting 20 to the respective port 2. In other words, it is preferred when for opening the lubrication ports 2, no additional steps have to be executed by the user besides connecting the lubrication fitting 20 to the respective port 2. Particular, drilling or cutting or a similar machining step may not be necessary for opening the lubrication ports 2. This way, re-lubricating via the lubrication ports 2 may become particularly fast and easy.

Figure 2:
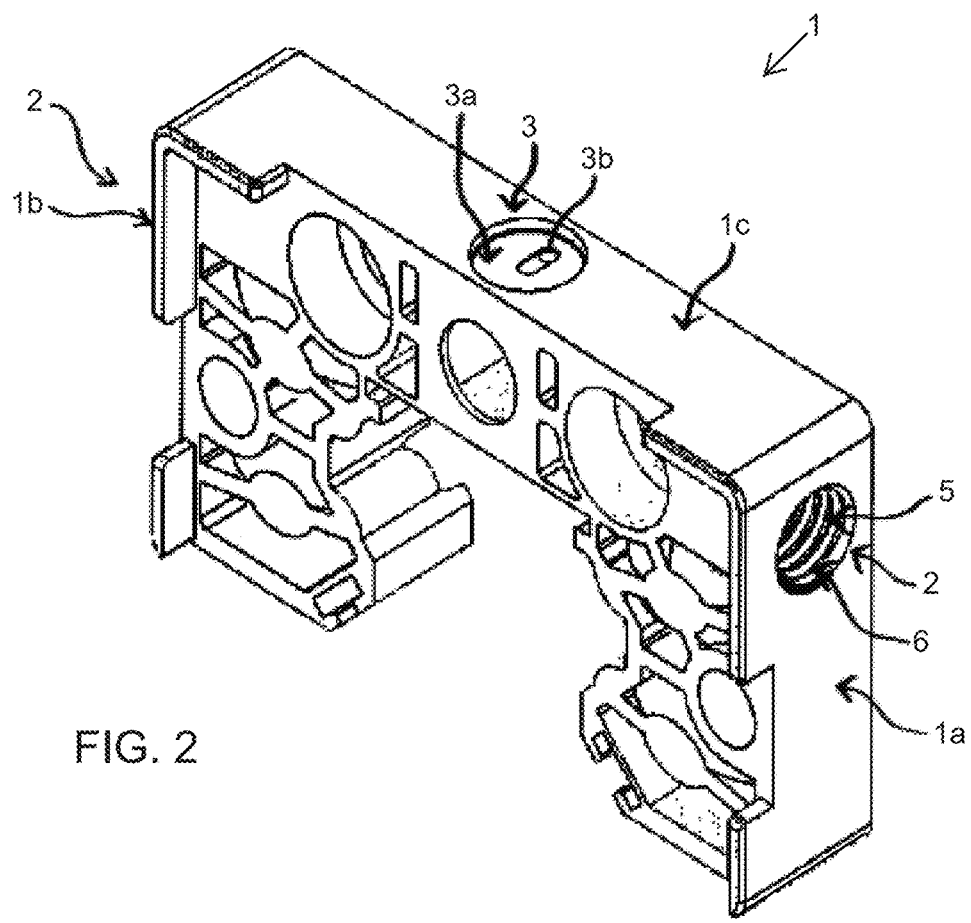
FIG. 2 is a perspective view an example of a part of an end cap for a carriage of the linear guide.

FIG. 2 shows an example of a part of an end cap 1 for a carriage of a linear guide. The end cap 1 may act as a housing for various components, e.g. redirecting means configured to redirect rolling elements, lubrication reservoirs, sealing elements and/or the same. The part of the end cap 1 shown in FIG. 2 is preferably fabricated from a plastic material, in particular injection moulded.

The end cap 1 contains two lubrication ports 2 arranged on either one of two opposing side faces 1a, 1b of the end cap 1. The end cap 1 also has a further lubrication port 3 at a top face 1c of the end cap 1. Preferably, all of the lubrication ports 2, 3 are closed initially and can be opened upon first using the respective lubrication port 2 for re-lubricating the carriage.

As can be seen in FIG. 2, the further lubrication port 3 is closed by means of a lid 3a integral with the shown part of the end cap 1. For opening the port 3, the lid 3a has a recess 3b, allowing a user to position the tip of a drill. When the lid 3a is drilled open, the user can establish a connection with an external lubricant reservoir and a lubricant channel (not visible) arranged behind the lid 3a. For example, the user may connect a lubrication fitting to the further lubrication port 3.

In contrast, the lubrication ports 2 are preferably configured as blind holes 5, wherein the bottom of each hole closes the respective port 2. Advantageously, the ports 2 are openable by operatively connecting a lubrication fitting (not shown) to the respective port 2, in particular by inserting the lubrication fitting into the respective blind hole 5.

In the example shown in FIG. 2, the blind holes 5 each contain a threading 6, thus allowing to screw a lubrication fitting into the respective hole 5. However, other means of inserting and/or fastening the lubrication fitting into the blind hole 5, for example by press-fitting or sliding and gluing, are also conceivable.

Preferably, the lubrication ports 2 each comprise a mechanism (not visible) configured to open the respective port 2 upon connecting a lubrication fitting, in particular upon inserting the fitting into the blind hole 5. The mechanism is advantageously arranged at the bottom of the blind hole 5. The mechanism may be activated by exerting a force on the mechanism, wherein the force may be generated e.g. by screwing the fitting into the blind hole 5.

Figure 3:
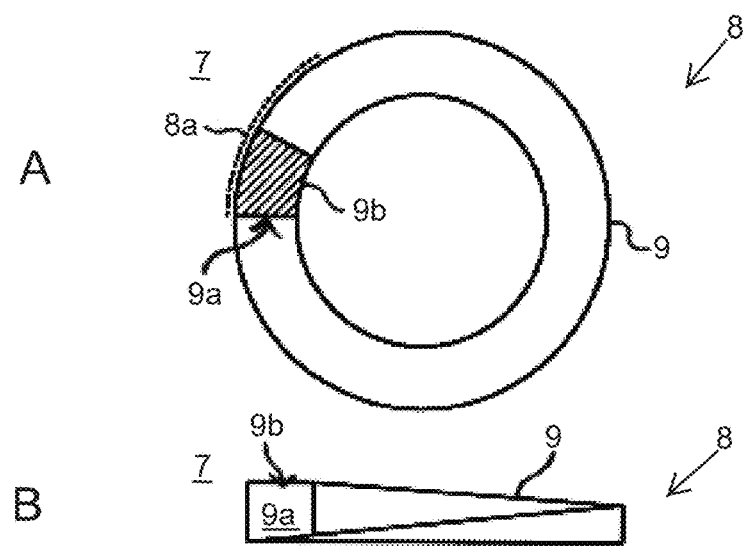
FIG. 3A is a plan view of an example of a mechanism for opening a closed lubrication port.
FIG. 3B is a side view of the mechanism for opening the closed lubrication port.

FIGS. 3A and 3B show an example of a mechanism 7 for opening a closed lubrication port. FIG. 3A shows a top view of the mechanism 7, while FIG. 3B shows a side view.

In the example shown in FIGS. 3A-3B, the mechanism 7 has a protrusion 8. The protrusion 8 may be arranged on the bottom of a blind hole forming the lubrication port, for example. The protrusion 8 has the form of a ramp 9, as is illustrated particularly well in FIG. 3B. The ramp 9 climbs up to a ledge 9a of the ramp 9, wherein the ledge 9a forms an upper end of the ramp 9. The ramp 9 has a contact section 9b at the upper end, as indicated by the hatching in FIG. 3A.

When a lubrication fitting is operatively connected to the lubrication port, the tip of the fitting may abut on the protrusion 8. In particular, the tip of the fitting may contact the contact section 9b of the ramp 9. The fitting may exert a force on the protrusion 8, in particular the contact section 9b. The resulting pressure may open the lubrication port, in particular the bottom of the blind hole. For example, by means of exerting the force on the protrusion 8, the lubrication fitting may puncture the bottom of the blind hole.

As the resulting pressure advantageously only or at least predominantly acts at the contact section 9b, the created opening may be slit-like and defined by at least a part of the contour 8a of the protrusion 8, in particular the ramp 9. A part of the contour 8a is indicated in FIG. 3A by a dashed line.

When the opening is large enough, the protrusion 8 may at least partially hinge relative to the bottom of the blind hole under the pressure exerted by the lubrication fitting. In particular, the upper end of the ramp 9, especially the contact section 9b, may be pushed down towards the bottom of the blind hole, thereby leading to a hinging of at least a part of the protrusion 8.

Figure 4:
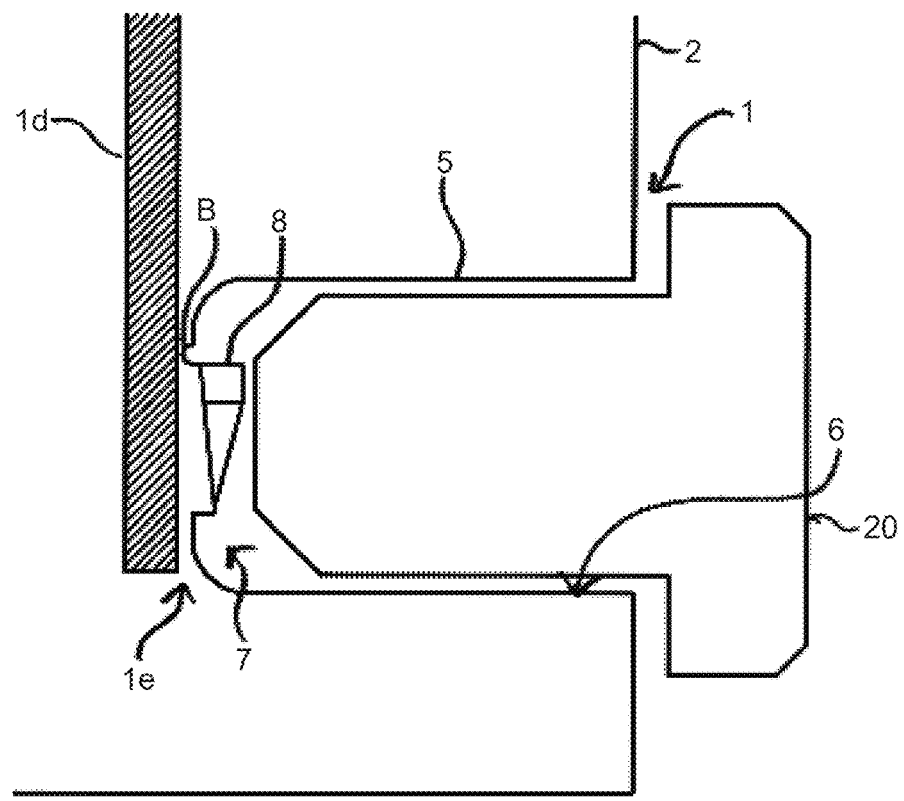
FIG. 4 is a cross-sectional view of an example of the closed lubrication port.

FIG. 4 shows an example of a closed lubrication port 2 of an end cap 1 for a carriage of a linear guide in a cross-sectional view. The lubrication port 2 is configured as a blind hole 5 and comprises a mechanism 7 for opening the lubrication port 2 to a lubrication channel 1d of the end cap 1. The mechanism 7 is activatable by operatively connecting a lubrication fitting 20 to the port 2, in particular by inserting the fitting 20 into the blind hole 5. To this end, the hole 5 preferably contains a threading 6 configured to mesh with a corresponding threading on the fitting 20.

The bottom of the blind hole 5 is preferably formed by a material layer 1e of the end cap 1. The material layer 1e separates the lubrication channel 1d from the lubrication port 2. The mechanism 7 preferably contains a protrusion 8 formed on the bottom of the hole 5, wherein the protrusion 8—and thereby the mechanism 7—is integral with the material layer 1e. Advantageously, the protrusion 8 has the shape of a ramp for providing a contact section at the top of the ramp (cf. FIG. 3). The contact section is configured to receive a force exerted when operatively connecting the lubrication fitting 20 to the lubrication port 2, i.e. when inserting the fitting 20 into the blind hole 5. Due to the limited size of the contact section, exerting a force onto the protrusion 8 may lead to a high pressure on the material layer 1e. This enables puncturing the material layer 1e such that a lubricant passage is established between the port 2, in particular the hole 5, and the lubrication channel 1d.

In order to facilitate puncturing, the lubrication port 2 may comprise a predetermined breaking point B. The breaking point B is preferably formed by a thinning of the material layer 1e. Advantageously, the breaking point B is arranged along at least a part of a contour of the protrusion 8, in particular in a region along the contact section (cf. FIGS. 3A-3B).

Upon puncturing of the lubrication port 2 by inserting the lubrication fitting 20 into the blind hole 5 and exerting a force onto the contact surface at the top of the ramp, the protrusion 8 or at least a part thereof may hinge towards the lubrication channel 1d. Thereby, an opening may be formed through which lubricant can flow from the lubrication port 2 into the channel 1d.

By showing both the lubrication fitting 20 and the lubrication port 2, FIG. 4 also illustrates a method for lubricating the carriage. As has been described above, by operatively coupling the fitting 20 to the port 2, in particular by screwing the fitting 20 into the blind hole 5 via the threading 6, the lubrication port 2 can be opened. Once the passage to the lubrication channel 1d has been established, a lubricant can be provided via the lubrication fitting 20.

The lubrication port 2, in particular the ramp (cf. FIGS. 3A-3B), may be obtained during injection molding of the end cap 1. Preferably, the lubrication port 2 is formed during rotary demolding. In particular, a pin having a recess corresponding to the protrusion 8 at its tip is pulled out of the blind hole 5. In order to create the threading 6, the pin is rotated upon pulling out of the hole 5. This is facilitated by the protrusion 8 having the form of a ramp.

The following is a summary list of reference numerals and the corresponding structure used in the above description of the invention:
1 end cap
1a side face
1b side face
1c top face
1d lubrication channel
1e material layer
2 lubrication port
3, 4 further lubrication port
3a lid
3b recess
5 blind hole
6 threading
7 mechanism
8 protrusion
8a contour
9 ramp
9a ledge
9b contact section
10 carriage
11 guide rail
20 lubrication fitting
100 linear guide
B breaking point

The invention claimed is:

1. An end cap for a carriage of a linear guide, the end cap comprising:
a closed lubrication port being openable by operatively connecting a lubrication fitting to said closed lubrication port, said lubrication port having a blind hole and a protrusion arranged on a bottom of said blind hole, said protrusion being configured for abutting against the lubrication fitting when the lubrication fitting is operatively connected to said lubrication port for opening said lubrication port, said lubrication port being openable by substantially fully inserting the lubrication fitting in said blind hole and exerting a force on said protrusion.

2. The end cap according to claim 1, wherein said protrusion configured to create a lubricant passage to a lubrication channel of the end cap when said lubrication fitting is operatively connected to said lubrication port.

3. The end cap according to claim 1, wherein said lubrication port has a threading and is openable by screwing said lubrication fitting into said lubrication port.

4. The end cap according to claim 1, wherein said lubrication port is puncturable by operatively connecting said lubrication fitting to said lubrication port.

5. The end cap according to claim 1, wherein said lubrication port contains a predetermined breaking point.

6. A carriage for a linear guide, the carriage comprising: said end cap according to claim 1.

7. A linear guide, comprising:
a guide rail; and
a carriage configured for linear movement along said guide rail and having said at least one end cap according to claim 1.

8. A method for producing an end cap having a lubrication fitting and a closed lubrication port being openable by operatively connecting said lubrication fitting to said closed lubrication port, which comprises the steps of:
injection molding the end cap according to claim 1; and
forming the closed lubrication port of the end cap by rotary demolding.

9. A method for lubricating a carriage of a linear guide, which comprises the step of:
providing the end cap according to claim 1
opening the closed lubrication port of the end cap by operatively connecting the lubrication fitting to the closed lubrication port.

10. An end cap for a carriage of a linear guide, the end Cap comprising:
a closed lubrication port being openable by operatively connecting a lubrication fitting to said closed lubrication port, said lubrication port having a blind hole and a protrusion arranged on a bottom of said blind hole, said protrusion being configured for abutting against the lubrication fitting when the lubrication fitting is operatively connected to said lubrication port for opening said lubrication port, said protrusion defining a ramp having a contact section at an upper end for contacting said lubrication fitting upon operatively coupling said lubrication fitting to said lubrication port, said lubrication port being openable by inserting the lubrication fitting into said blind hole and exerting a force on said protrusion.

11. An end cap for a carriage of a linear guide, the end cap comprising:
a closed lubrication port being openable by operatively connecting a lubrication fitting to said closed lubrication port, said lubrication port having a blind hole and a protrusion arranged on a bottom of said blind hole, said protrusion being configured for abutting against the lubrication fitting when the lubrication fitting is operatively connected to said lubrication port for opening said lubrication port, said lubrication port containing an opening section configured for hinging upon operatively coupling said lubrication fitting to said lubrication port, said lubrication port being openable by inserting the lubrication fitting into said blind hole and exerting a force on said protrusion.

* * * * *